US012194647B2

(12) United States Patent
Wu

(10) Patent No.: US 12,194,647 B2
(45) Date of Patent: Jan. 14, 2025

(54) RECIPROCATING RAZOR BLADE CARTRIDGE AND MANUFACTURING METHOD

(71) Applicant: LITTLE STONE CERAMIC BLADE (ZHONGSHAN) COMPANY LTD., Guangdong (CN)

(72) Inventor: Rangpan Wu, Zhongshan (CN)

(73) Assignee: LITTLE STONE CERAMIC BLADE (ZHONGSHAN) COMPANY LTD., Guangdong (CN)

( * ) Notice: Subject to any disclaimer, the term of this patent is extended or adjusted under 35 U.S.C. 154(b) by 298 days.

(21) Appl. No.: 17/917,079

(22) PCT Filed: Apr. 30, 2021

(86) PCT No.: PCT/CN2021/091605

§ 371 (c)(1),
(2) Date: Oct. 5, 2022

(87) PCT Pub. No.: WO2021/213531

PCT Pub. Date: Oct. 28, 2021

(65) Prior Publication Data

US 2023/0150155 A1 May 18, 2023

(30) Foreign Application Priority Data

Apr. 24, 2020 (CN) ......................... 202010333469.2

(51) Int. Cl.
*B26B 19/08* (2006.01)
*B26B 19/04* (2006.01)

(52) U.S. Cl.
CPC ............ *B26B 19/08* (2013.01); *B26B 19/044* (2013.01)

(58) Field of Classification Search
CPC ................................ B26B 19/08; B26B 19/44
(Continued)

(56) References Cited

U.S. PATENT DOCUMENTS 5,548,899 A 8/1996 Tanahashi et al.
6,082,004 A 7/2000 Hotani
(Continued)

FOREIGN PATENT DOCUMENTS

CN 204954880 U 1/2016
CN 106346519 A 1/2017
(Continued)

OTHER PUBLICATIONS

Aug. 6, 2021 International Search Report issued in International Patent Application No. PCT/CN2021/091605.
(Continued)

*Primary Examiner* — Omar Flores Sanchez
(74) *Attorney, Agent, or Firm* — Oliff PLC

(57) ABSTRACT

A reciprocating razor blade cartridge having fixed blade and fixed blade support, fixed blade is flexible metal sheet, fixed blade support is basin-shaped and supported by basin opening edge, all sides of fixed blade bent downwards and wrapped on outside of basin wall around fixed blade support and make top surface of fixed blade and side surface close to top surface smoothly transition, inner cutting cavity formed between fixed blade and fixed blade support, fixed blade includes hair inlet holes allow body hair enter inner cutting cavity, inner cutting cavity below fixed blade includes movable blade can reciprocate back and forth relative to fixed blade and cut off body hair, movable blade has cutting teeth for cutting body hair corresponding to hair inlet holes, reciprocating razor blade cartridge includes transmission component passes through bottom of fixed blade support to connect movable blade with power device of electric razor.

20 Claims, 7 Drawing Sheets

(58) Field of Classification Search
USPC .............................................................. 30/41
See application file for complete search history.

(56) References Cited

U.S. PATENT DOCUMENTS

| | | | | |
|---|---|---|---|---|
| 2010/0139099 | A1* | 6/2010 | Blaauw | B26B 19/044 30/346.54 |
| 2011/0067244 | A1* | 3/2011 | Eichhorn | B26B 19/044 30/43.92 |
| 2018/0257248 | A1* | 9/2018 | Wu | B26B 19/08 |
| 2020/0316793 | A1* | 10/2020 | Phoon | B26B 19/3846 |

FOREIGN PATENT DOCUMENTS

| | | | |
|---|---|---|---|
| CN | 206455695 | U | 9/2017 |
| CN | 207901223 | U | 9/2018 |
| CN | 109366531 | A | 2/2019 |
| CN | 110421599 | A | 11/2019 |
| CN | 209682252 | U | 11/2019 |
| CN | 111390978 | A | 7/2020 |
| CN | 212287729 | U | 1/2021 |

OTHER PUBLICATIONS

Aug. 6, 2021 Written Opinion issued in International Patent Application No. PCT/CN2021/091605.

* cited by examiner

RECIPROCATING RAZOR BLADE CARTRIDGE AND MANUFACTURING METHOD

TECHNICAL FIELD

The present invention relates to a reciprocating razor blade cartridge and to a manufacturing method for a reciprocating razor blade cartridge.

BACKGROUND ART

Existing reciprocating electric razor blade cartridges, such as Patent Gazette No. CN204954880 U, entitled "Blade Set and Hair Cutting Appliance", and Patent No. ZL201610889953.7, entitled "Reciprocating Electric Razor Blade Cartridge", due to the limitations of the existing manufacturing process and the mature design concept thereof, a blade net of a blade cartridge is composed of a thin sheet metal fixed blade which is correspondingly bent from left and right ends and then fixed on the left and right sides of the fixed blade support by injection molding or other means, and is designed as a linear shape with the front and back ends open (the direction of the reciprocating motion of the movable blade is the front and back direction); the front and back ends are provided with ports; the movable blade and other components are respectively mounted from the front and back ends; there is a risk of pricking the skin on the two ports since an edge of the fixed blade is exposed; in order to avoid pricking the skin with a sharp edge when scraping hair, it is usually necessary to wrap an end cap on the two ends so as to shield the edge of the blade; when this blade cartridge structure is used, firstly, the end cap abuts the skin, and the cutting surface is lifted by the end cap; since most of the skin has a curved shape capable of pressing and changing, it is only necessary to make the end cap thin, then most of the cut surfaces still cut hair well against the skin, only a small portion of the cut surfaces near the end cap will be lifted by the end cap above the skin and cannot be cut effectively; however, in some depressed areas, such as an arm socket, the cutting surface is held against the end caps and does not effectively contact the skin for shaving. In addition, the existing end caps, which are usually injection molded parts, can scratch people with plastic corners and capes, although they do not prick the skin as a blade edge, and also cause some discomfort.

The invention is made based on the above.

SUMMARY OF THE INVENTION

It is an object of the present invention to overcome the disadvantages of the prior art and to provide a reciprocating razor blade cartridge of simple structure and low cost. The reciprocating razor blade cartridge forms a leather drum structure by wrapping the upper end of a fixed blade support and a basin opening from top to bottom by a fixed blade, has a cutting top surface with a smooth transition and a side surface near the top surface, is smooth and in order, and is skin-fitted, and can remove body hairs once.

The present invention is achieved by the following technical solution:

A reciprocating razor blade cartridge is characterized by comprising a fixed blade and a fixed blade support for supporting and fixing the fixed blade, wherein the fixed blade is a flexible metal sheet having flexibility, the fixed blade support is a basin-shaped support, the fixed blade is supported by a basin opening edge of the fixed blade support, all sides of the fixed blade are bent downwards and wrapped on the outside of a basin wall all around the fixed blade support and make a top surface of the fixed blade and a side surface close to the top surface smoothly transition, an inner cutting cavity is formed between the fixed blade and the fixed blade support, hair inlet holes for body hair to enter the inner cutting cavity is provided on the fixed blade, and a movable blade which can reciprocate back and forth relative to the fixed blade and then cut off the body hair in the hair inlet holes are provided in the inner cutting cavity below the fixed blade, the movable blade is provided with cutting teeth corresponding to the hair inlet holes and used for cutting body hair, and the reciprocating razor blade cartridge further comprises a transmission component which passes through the bottom of the fixed blade support to connect the movable blade with the power device of the electric razor.

The reciprocating razor blade cartridge as described above is characterized in that rounded corners are provided between the left and right basin walls and the front and rear basin walls of the fixed blade support to enable the left and right basin walls and the front and rear basin walls to be connected in a smooth transition.

The reciprocating razor blade cartridge as described above is characterized in that the fixed blade support is provided with a hair removing hole for removing hairs cut in the inner cutting cavity.

The reciprocating razor blade cartridge as described above is characterized in that the fixed blade and the fixed blade support are made of a weldable metal material, and the side surface of the fixed blade bent downwards from the periphery is welded on the basin wall around the fixed blade support.

The reciprocating razor blade cartridge as described above is characterized in that the hair inlet holes are uniformly arranged on a left side and/or right side of the fixed blade, fixed cutting teeth are formed between two adjacent hair inlet holes, and the left and/or the right basin wall of the fixed blade support is provided with hair inlet grooves corresponding to the hair inlet holes, which can supply body hairs to and from the inner cutting cavity.

The reciprocating razor blade cartridge as described above is characterized in that the top surface and the left and right side surfaces of the fixed blade are respectively at an acute angle, and a chamfer with a smooth transition is formed between the top surface and the left and right side surfaces, wherein a height D of the chamfer is less than 1.0 mm.

The reciprocating razor blade cartridge as described above is characterized in that the left side and/or the right side of the hair inlet holes is an isthmus structure recessed from the outer side to the inner side in the left-right direction, the isthmus structure is composed of a continuous smooth curve, and is wide to narrow from the outer side to the middle part, and then narrow to wide from the middle part to the inner side; the width at the inlet of the outer side is L1, the width at the narrowest part of the middle part is L2, and the corresponding cutting teeth is located at the inner side of the narrowest part of the middle part; the width of the isthmus structure at the position corresponding to the outer edge of the cutting teeth is L3, the depth from the narrowest part of the middle part to the outer edge of the corresponding cutting teeth is L4, and the depth from the inlet of the outer side to the outer edge of the corresponding cutting teeth is L5; the following relationship is satisfied: $L1>L3>L2$, and $0.1\ mm \leq L2 \leq 0.3\ mm$, $0.1\ mm \leq L4 \leq 1\ mm$, and $L5 \leq 1.2\ mm$.

The reciprocating razor blade cartridge as described above is characterized in that the left and right basin walls and the front and rear basin walls of the fixed blade support are of the same height at the basin opening, the top surface of the fixed blade is a plane, and the top surface of the movable blade is a plane cooperating with the bottom surface of the fixed blade.

The reciprocating razor blade cartridge as described above is characterized in that the front and rear basin walls of the fixed blade support are higher than the left and right basin walls, and the top portions of the front and rear basin walls are of an arc structure and smoothly transition with the left and right basin walls; the top surface of the fixed blade is an arc surface corresponding to the front and rear basin walls, and the top surface of the movable blade is an arc surface matching the bottom surface of the fixed blade.

Another technical problem to be solved by the present invention is to provide a method for manufacturing a reciprocating razor blade cartridge as described above, which has a simple process, wherein a fixed blade wraps the upper end of the fixed blade support and a basin opening from top to bottom to form a leather drum structure, has a cutting top surface with a smooth transition and a side surface close to the top surface, is smooth and in order, and is skin-fitted, so as to improve the shaving effect of the reciprocating razor blade cartridge.

The present invention is achieved by the following technical solution:

A method of making a reciprocating razor blade cartridge as described above, which comprises the steps of:

A. manufacturing the fixed blade in expanded state according to the design;

B. connecting the movable blade with the transmission component and installing same in the fixed blade support;

C. stretching the fixed blade to the periphery, taking the edge of the basin opening of the fixed blade support as a support, bending and tensioning the periphery of the fixed blade downwards under the action of a certain external force, adhering to the outside of the basin wall around the fixed blade support, and tightening and fixing the fixed blade to the basin wall of the fixed blade support by welding or riveting, so that the top surface of the fixed blade and the side surface close to the top surface are in a smooth transition, and wrapping the upper end of the fixed blade support and the basin opening from top to west to form a leather drum structure.

Compared to the prior art, the present invention has the following advantages:

1. in the present invention, the fixed blade is a flexible metal sheet, and by means of the support of the basin wall around the fixed blade support, due to the flexibility and toughness of the flexible metal sheet itself, the fixed blade can be stretched to the periphery, and under the action of a certain external force, the periphery of the fixed blade is bent and tensioned downwards, and is adhered to the outside of the basin wall around the fixed blade support, and the fixed blade is tightly fixed on the basin wall of the fixed blade support by welding or riveting, so that the top surface of the fixed blade and the side surface close to the top surface are in a smooth transition; an upper end of the fixed blade support and the basin opening are wrapped from top to bottom to form a leather drum structure, wherein the top surface and the side surface of the fixed blade are the top surface and the side surface of the razor blade cartridge, which are smooth, in order and skin fitting; when cutting hair, the razor blade cartridge moves against the skin with the top surface of the fixed blade and/or the side surface close to the top surface, the cutting surface can be cut against the skin in all directions, with good cutting effect, can cut some concave parts of the body conveniently, and the contact surface with the skin is the top surface of the fixed blade with a smooth transition and/or the side surface close to the top surface, so that the razor blade cartridge can slide smoothly on the skin surface, with shaving comfort.

2. In the present invention, the fixed blade and the fixed blade support form a leather drum-like structure, the fixed blade support is a drum body, and the fixed blade is a tensioned drum skin covered on the drum body, and due to the principle that the drum skin of the leather drum has a pre-tension, the fixed blade is tightened on the fixed blade support, so that the fixed blade can obtain a very flat cutting working surface in contact with the movable blade without requiring additional precision machining, and the process is simple, the machining is convenient, and the part manufacturing cost is low; in addition, avoiding the rigidity requirement of the fixed blade, the thickness of the fixed blade can be made ultra-thin which cannot be realized by other technical structures, and the thickness h of the fixed blade can be made in a range of $0<h<0.08$ mm, so that the influence of the thickness of the fixed blade can be ignored when shaving, and the body hair can be removed once.

3. In the present invention, the hair inlet holes located on the left and right sides are of an isthmus structure recessed from the outer side to the inner side in the left and right direction, the isthmus structure is composed of a continuous smooth curve, and widens from the outer side to the middle part and then widens from the middle part to the inner side, the width of the outer side inlet is L1, the width of the narrowest part of the middle part is L2, and the corresponding cutting teeth are located on the inner side of the narrowest part; the initial position resulting from the cutting of the isthmus structure, i.e., the position at the outer edge of the isthmus structure corresponding to the cutting teeth, wherein the width at the initial position resulting from the cutting is L3, the depth from the narrowest part in the middle to the outer edge of the corresponding cutting teeth is L4, and the depth from the outer inlet to the outer edge of the corresponding cutting teeth is L5, satisfying the following relationship: $L1>L3>L2$, and 0.1 mm≤L2≤0.3 mm, 0.1 mm≤L4≤1 mm, L5≤1.2 mm, with a preferred range of 0.2 mm≤L4≤0.4 mm, L5≤1.0 mm, then the hair inlet holes are both convenient for a hair inlet and can prevent the hair from running out after the hair enters, both playing a good cutting effect, and at the same time, when moving to cut, the skin can be squeezed out at a narrow position, preventing the skin from contacting the movable blade moving at a high speed at the initial position generated from the cutting.

4. In the present invention, the top surface and the left and right side surfaces of the fixed blade are respectively at an acute angle, and a chamfer with a smooth transition is formed between the top surface and the left and right side surfaces, wherein the height D of the chamfer is less than 1.0 mm, so that the fixed cutting teeth on the left and right sides form a comb tooth structure which is beneficial for combing hair, and the effect of guiding hair and passing hair is good and the cutting effect is improved.

5. In the present invention, the manufacturing method, process and manufacturing cost of the reciprocating razor blade cartridge are simple and low. The top surface and the side surface near the top surface of the razor blade cartridge are formed by stretching an integral fixed blade and then wrapping downward. The razor blade cartridge is smooth and in order and skin-fitting, and avoids the requirement for high rigidity of the fixed blade, so that the thickness of the fixed blade can be made ultra-thin which cannot be realized by other process structures, so that the influence of the thickness of the fixed blade can be ignored when shaving, and the body hair can be removed once.
6. In the present invention, the thickness of the fixed blade is h, satisfying: $0<h\leq 0.08$ mm, ultra-thin flexible metal sheet is used to make the removal of body hair cleaner.
7. In the present invention, an elastic pressing piece capable of pressing the movable blade against the fixed blade is provided between the movable blade and the fixed blade support, so that the removal of body hair is easier and the reciprocating razor blade cartridge is sharper.

DETAILED DESCRIPTION OF THE INVENTION

Figure 1:
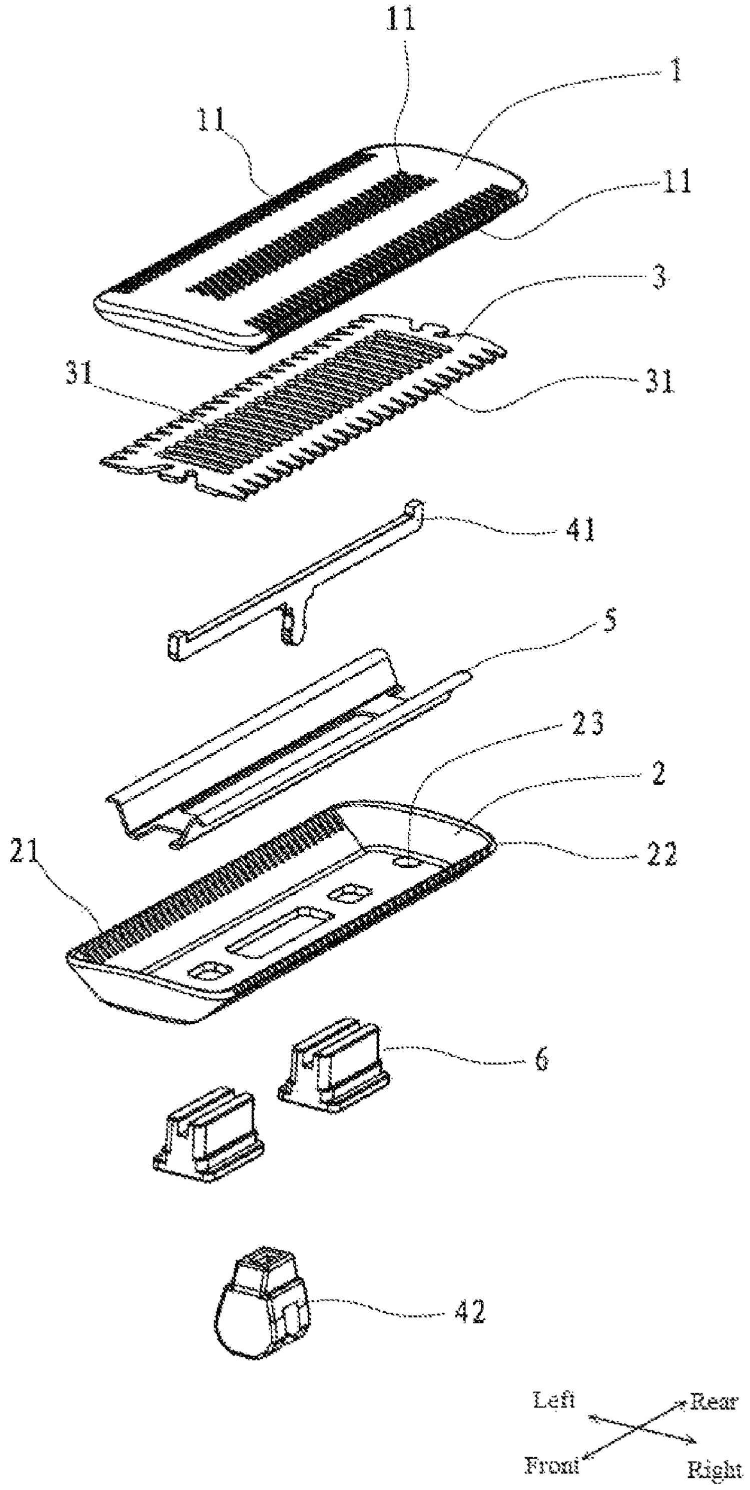
FIG. 1 is an exploded view of a reciprocating razor blade cartridge according to the present invention.
Figure 2:
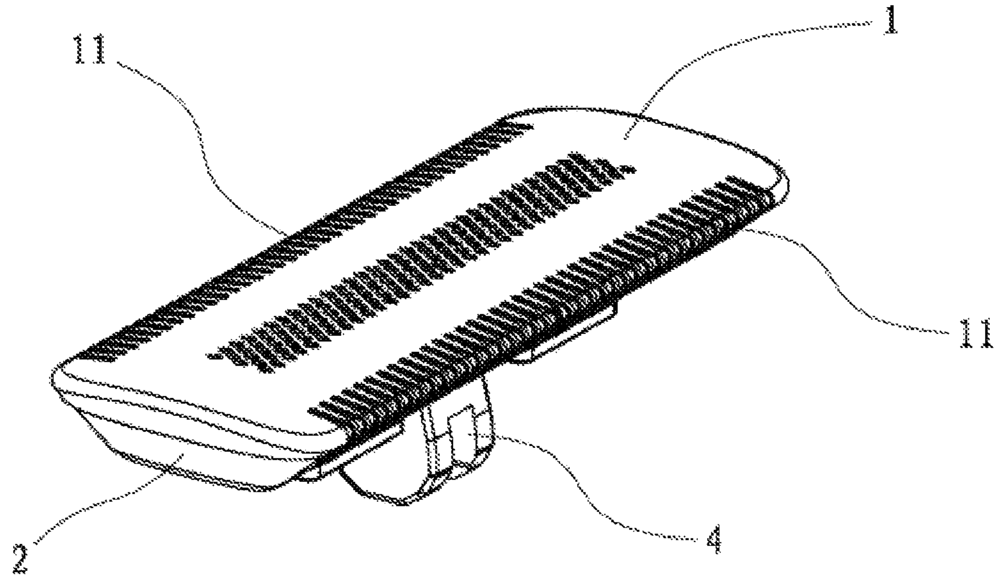
FIG. 2 is a schematic view of a reciprocating razor blade cartridge according to the present invention.
Figure 3:
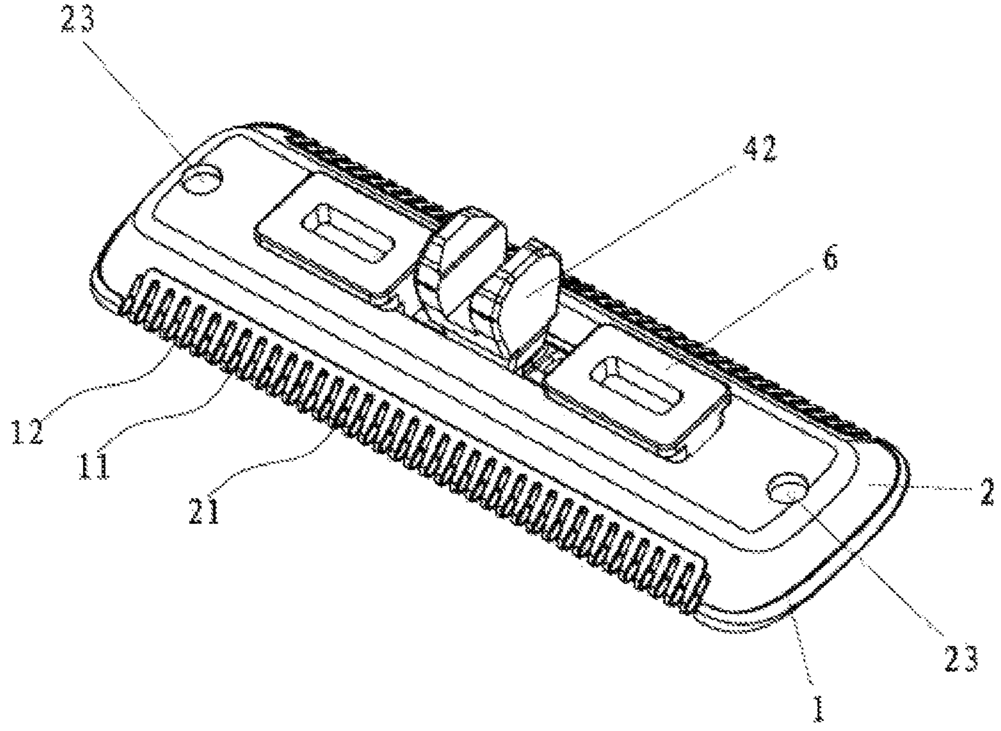
FIG. 3 is a schematic view of the bottom structure of a reciprocating razor blade cartridge according to the present invention.
Figure 4:
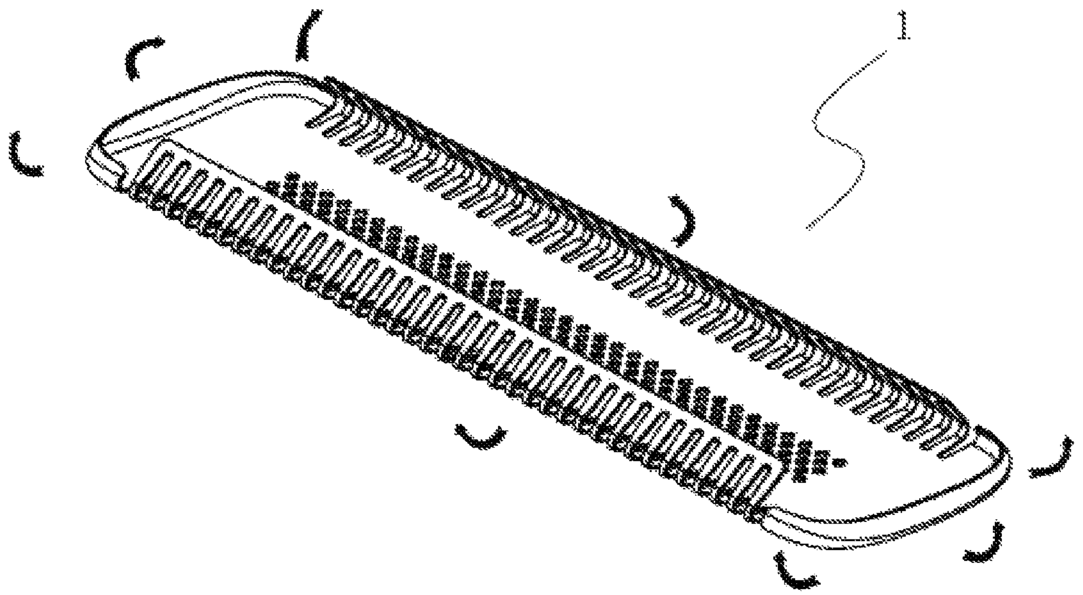
FIG. 4 is a schematic diagram of the stretching and bending of the fixed blade according to the present invention.

The invention will now be further described with reference to the accompanying drawings: a reciprocating razor blade cartridge as shown in FIGS. 1-12 comprises a fixed blade 1 and a fixed blade support 2 for supporting and fixing the fixed blade 1, wherein the fixed blade 1 is a flexible metal sheet having flexibility, the fixed blade support 2 is a basin-shaped support, the fixed blade 1 is supported by an edge of a basin opening of the fixed blade support 2, all sides of the fixed blade 1 are bent downwards to wrap around the fixed blade support 2 on the outside of a basin wall around the fixed blade support 2 and make a top surface of the fixed blade 1 and a side surface close to the top surface smoothly transition, an inner cutting cavity 10 is formed between the fixed blade 1 and the fixed blade support 2, and hair inlet holes 11 is provided on the fixed blade 1 for feeding body hairs into the inner cutting cavity 10; a side wall of the hair hole 11 forms a cutting edge, a movable blade 3 which can reciprocate back and forth relative to the fixed blade 1 so as to cut the body hair in the hair hole 11 is provided below the fixed blade 1 in the inner cutting cavity 10, the movable blade 3 is provided with cutting teeth 31 corresponding to the hair inlet holes 11 and used for cutting body hair, and the reciprocating razor blade cartridge further comprises a transmission component 4 which passes through the bottom of the fixed blade support 2 and connects the movable blade 3 with a power device of the electric razor.

Since the fixed blade 1 is a flexible metal sheet, and by means of the support of the basin wall around the fixed blade support 2, due to the flexibility and toughness of the flexible metal sheet itself, the fixed blade 1 can be stretched to the periphery, and under the action of a certain external force, the periphery of the fixed blade 1 is bent and tensioned downwards, and is adhered to the outside of the basin wall around the fixed blade support 2, and the fixed blade 1 is tightly fixed on the basin wall of the fixed blade support 2 by welding or riveting, so that the top surface of the fixed blade 1 and the side surface close to the top surface are in a smooth transition, and the upper end of the fixed blade support 2 and the basin opening are wrapped from top to bottom to form a leather drum-like structure, the top surface and the side surface of the fixed blade 1 are the top surface and the side surface of the razor blade cartridge, smooth and in order and skin-fitting. When cutting hair, the razor blade cartridge moves against the skin with the top surface of the fixed blade 1, the side surface close to the top surface, or both the top surface and the side surface at the same time, the cutting surface can be cut against the skin in all directions, with good cutting effect, and can conveniently cut some depressed pails of the body, and the contact surface with the skin is the top surface of the fixed blade 1 with a smooth transition, the side surface close to the top surface, or both the top surface and the side surface at the same time contact the skin, so that the razor blade cartridge can slide smoothly on the skin surface, with shaving comfort.

In addition, the fixed blade 1 and the fixed blade support 2 form a leather drum-like structure, wherein the fixed blade support 2 is a drum body, and the fixed blade 1 is a tensioned drum skin covered on the drum body, and due to the principle that the drum skin of the leather drum has a pre-tension, the fixed blade 1 is tightened on the fixed blade support 2, so that the fixed blade 1 can obtain a very flat cutting working surface in contact with the movable blade 3 without requiring additional precision machining, and the process is simple, the machining is convenient and the part manufacturing cost is low; in addition, avoiding the rigidity requirement of the fixed blade 1, the thickness of the fixed blade 1 can be made ultra-thin which cannot be realized by other technical structures, the thickness h of the fixed blade 1 can be made in the range of $0<h<0.08$ mm, so that the influence of the thickness of the fixed blade 1 can be ignored when shaving, and the body hair can be removed once.

Rounded corners 22 are provided between the left and right basin walls and the front and rear basin walls of the fixed blade support 2 to enable the left and right basin walls and the front and rear basin walls to be connected in a smooth transition, so as to facilitate the downward bending and coating of the fixed blade 1, and enable the circular arc of the periphery of the fixed blade 1 to transition, so as to improve the comfort of cutting.

The hair inlet holes 11 can be uniformly arranged on the left side of the fixed blade 1, and can also be uniformly arranged on the right side of the fixed blade 1, and can also be arranged on both the left and right sides of the fixed blade 1, and fixed cutting teeth 12 are formed between two adjacent hair inlet holes 11; the left and right basin walls of the fixed blade support 2 are provided with hair inlet grooves 21 corresponding to the hair inlet holes 11, which can supply body discharging body hairs into and out of the inner cutting cavity 10; and the hairs can be fed through the hair inlet grooves 21, and after shaving is completed, the hairs can also be removed by a user. Of course, the fixed blade support 2 may be additionally provided with a hair removing hole 23 for removing the hair cut in the inner cutting cavity 10, so that the hair can be more easily removed.

The top surface and the left and right side surfaces of the fixed blade 1 are respectively at an acute angle, and a chamfer R1 with a smooth transition is formed between the top surface and the left and right side surfaces, wherein the height D of the chamfer R1 is less than 1.0 mm, and the effect of guiding hair and passing hair is good and the cutting effect is improved.

Figure 12:
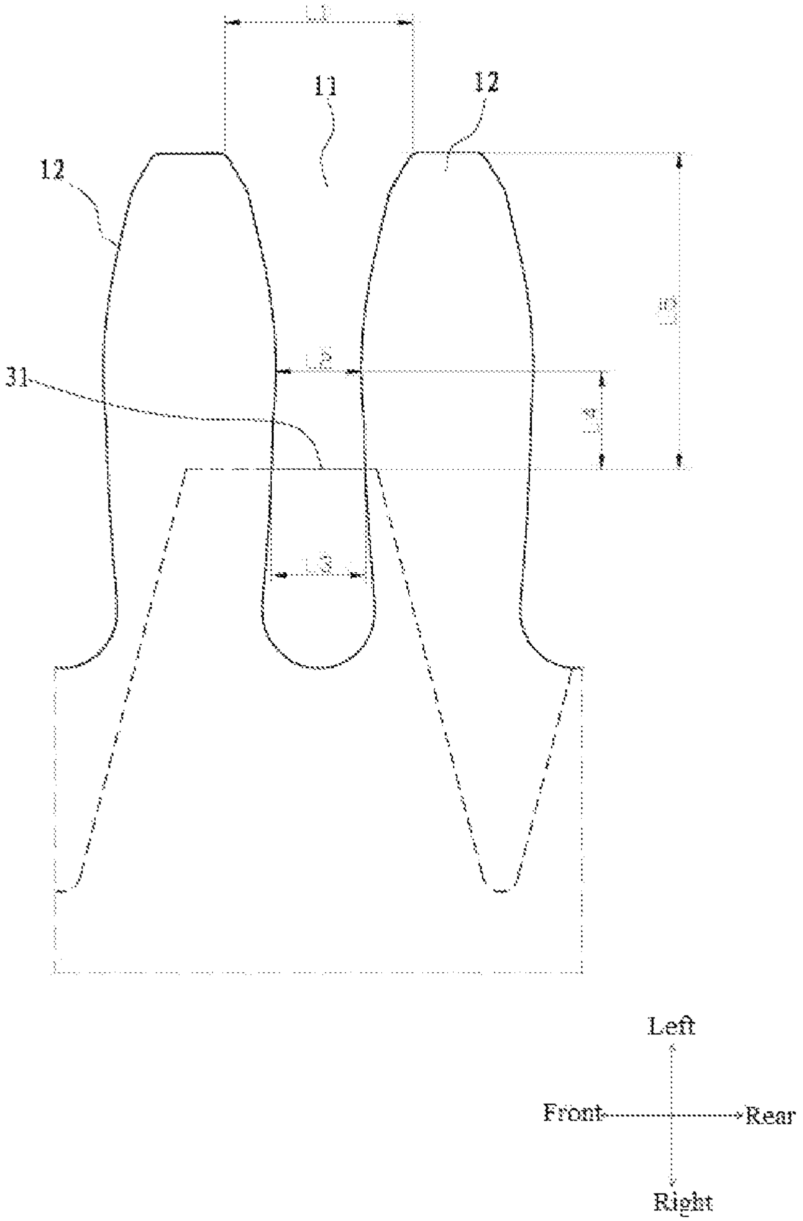
FIG. 12 is a schematic view showing the structure of the hair inlet holes on the left and right sides.

The hair inlet holes 11 located on the left and right sides are an isthmus structure recessed inwardly from the outer side to the inner side in the left and right direction, as shown in FIG. 12, the isthmus structure is composed of a continuous smooth curve, and is wide to narrow from the outer side to the middle part, and then narrow to wide from the middle part to the inner side, and the width of the outer side inlet is L1, the width of the narrowest part of the middle part is L2, and the corresponding cutting teeth 31 are located on the inner side of the narrowest part of the middle part; the initial position resulting from the cutting of the isthmus structure, i.e., the position of the isthmus structure corresponding to the outer edge of the cutting teeth 31, and the width at the initial position resulting from the cutting is L3, satisfying the following relationship: L1>L3>L2, with 0.1 mm≤L2≤0.3 min, the entrance width is convenient for hair entry, the middle is narrow and the inner is wide, so that the hair can be prevented from coming out again after entering; at the same time, when moving to cut, the skin entering from the outer entrance can be squeezed out at the narrow position, so that the skin is prevented from contacting with the movable blade moving at a high speed at the initial position generated by cutting.

As shown in FIG. 12, the depth of the isthmus structure from the narrowest part in the middle to the outer edge of the corresponding cutting teeth 31 is L4, and is 0.1 mm≤L4≤1 mm, so as to prevent the skin from deforming under compression, and when a part of the skin bulges to the inner side at the narrowest part in the middle, the cutting teeth 31 cuts the skin, preferably in the range of 0.2 mm≤L4≤0.4 mm, which not only plays a safety protection, but also can ensure that the hair is cut; the depth of the isthmus structure from the outer side entrance to the outer edge of the corresponding cutting teeth 31 is L5, L5≤1.2 mm, preferably in the range of L5≤1.0 mm, to ensure the depth of the hair entering to guide the hair into the cutting, while also facilitating the control of the depth of the isthmus structure to ensure the structural strength of the cutting teeth 12.

The central portion of the fixed blade 1 may further have hair inlet holes 11, and the movable blade 3 is correspondingly provided with cutting teeth 31 in the central portion so as to cut hairs in multiple directions.

Figure 10:
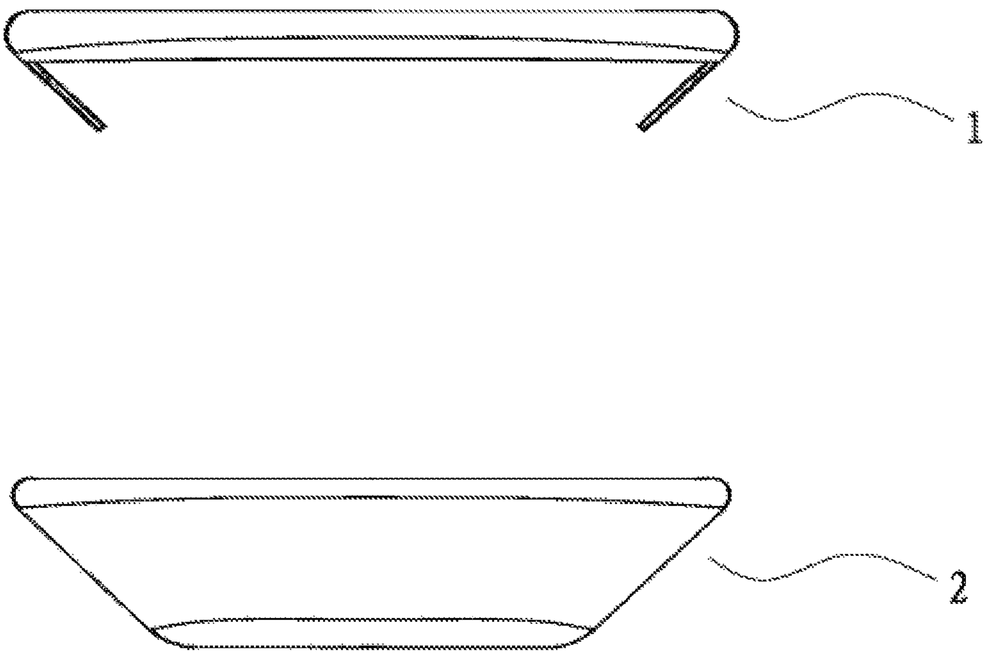
FIG. 10 is an exploded view of a fixed blade with a plane top surface and a corresponding fixed blade support.
Figure 11:
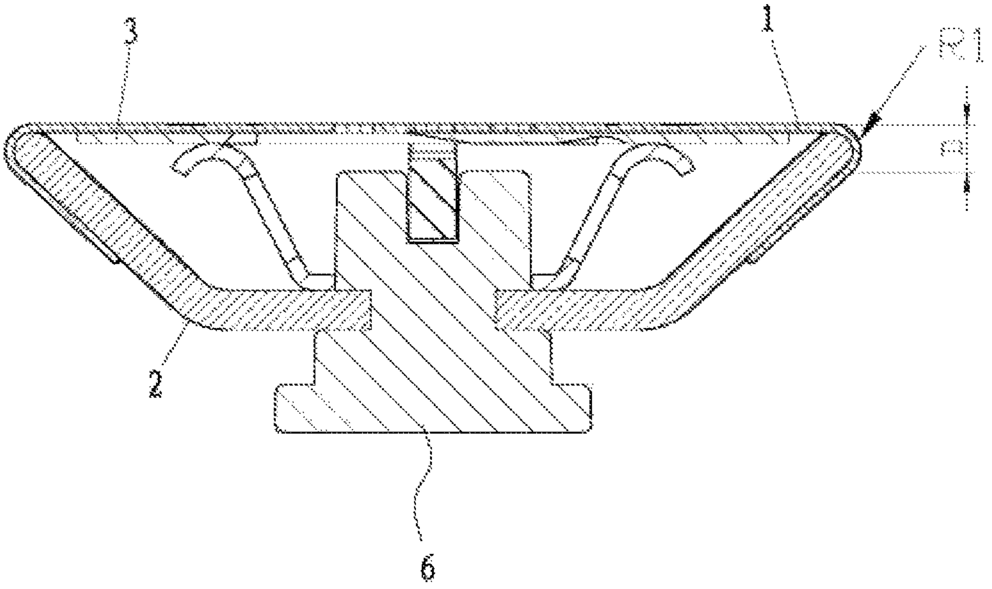
FIG. 11 is a cross-sectional view of the blade cartridge having a plane top surface in the direction B-B of FIG. 6.

The left and right basin walls and the front and rear basin walls of the fixed blade support 2 are of the same height at the basin opening, the top surface of the fixed blade 1 is a plane, and the top surface of the movable blade 3 is a plane cooperating with the bottom surface of the fixed blade 1 to achieve plane cutting, as shown in FIGS. 10 and 11.

Figure 8:
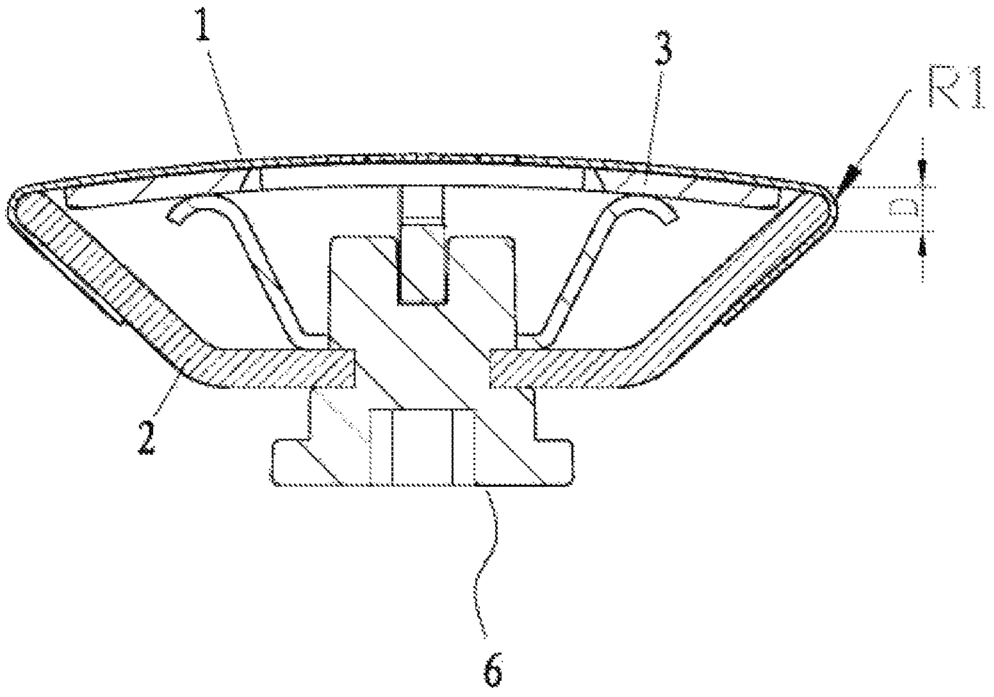
FIG. 8 is a cross-sectional view of the blade cartridge having an arc surface top surface configuration taken along line B-B of FIG. 6.
Figure 9:
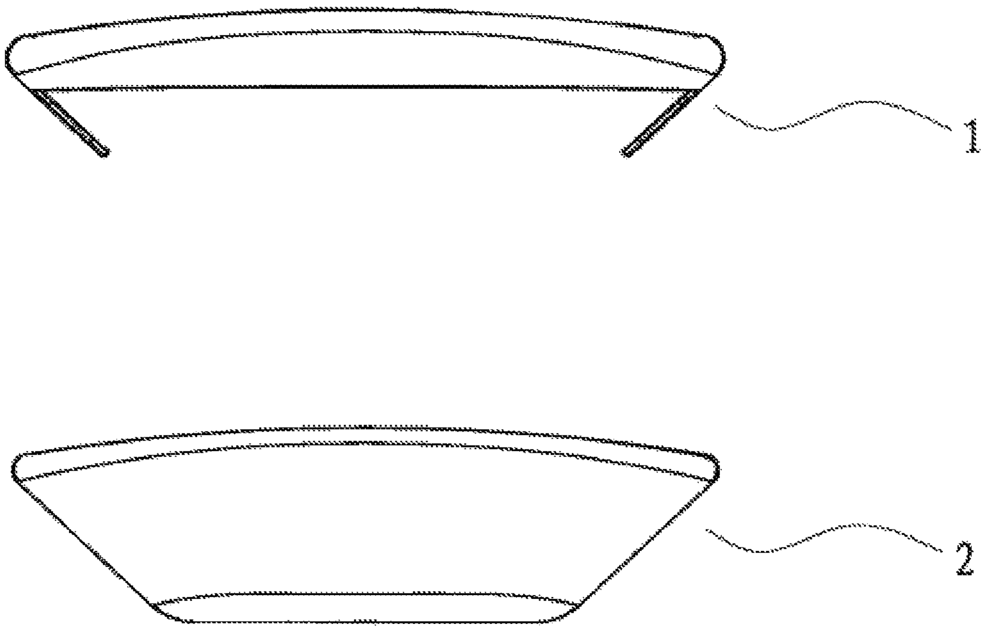
FIG. 9 is an exploded view of a fixed blade with an arc top surface and a corresponding fixed blade support.

Of course, as shown in FIGS. 8 and 9, the front and rear basin walls of the fixed blade support 2 may also be higher than the left and right basin walls, and the top portions of the front and rear basin walls are in an arc structure and smoothly transition with the left and right basin walls; the top surface of the fixed blade 1 is an arc surface corresponding to the front and rear basin walls; the top surface of the movable blade 3 is an arc surface cooperating with the bottom surface of the fixed blade 1 to achieve arc surface cutting; preferably, when the top surface of the fixed blade 1 is in an arc-shaped structure, the central portion of the fixed blade 1 has hair inlet holes 11, and the central portion of the movable blade 3 has cutting teeth 31 correspondingly, so as to better cut the shaved hair at the depressed part of the body.

The transmission component 4 comprises a movable blade support 41 fixedly connected to the movable blade 3 and a driving seat 42 connected to the power device of the electric razor, an elastic pressing piece 5 capable of pressing the movable blade 3 against the fixed blade 1 is provided between the movable blade 3 and the fixed blade support 2, and the movable blade 3 is pushed upwards by the elastic pressing piece 5, so that the movable blade 3 and the fixed blade 1 abut and form a pre-pressure, ensuring the sharpness of the body hair removed by the reciprocating razor blade cartridge.

A sliding support block 6 for supporting the movable blade support 41 and guiding the movable blade support 41 to reciprocate back and forth is fixed at the bottom of the fixed blade support 2, and the sliding support block 6 can be fixed on the fixed blade support 2 by means of integral injection moulding with the fixed blade support 2, as shown in FIGS. 8 and 11.

The fixed blade 1 and the fixed blade support 2 are made of a metal material capable of welding, so that the side surface of the fixed blade 1 bent downwards from the periphery is welded on the basin wall around the fixed blade support 2.

The fixed blade support 2 is a basin-shaped structure with a large basin opening and a small basin bottom, and the basin walls around the fixed blade support 2 are retracted inwards from top to bottom with the basin opening as a base point, so that after the fixed blade 1 is fixed on the basin wall, the edge thereof is retracted inside under the top part of the razor blade cartridge, avoiding contact with the skin.

Figure 5:
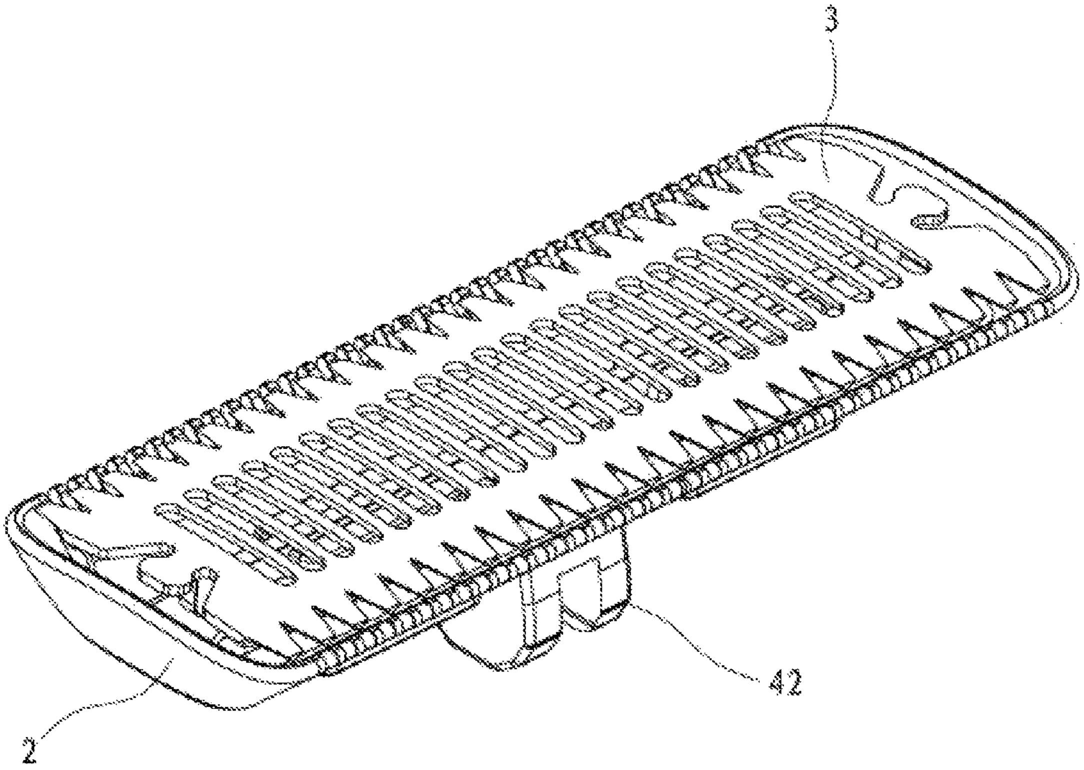
FIG. 5 is a schematic view of the blade cartridge without mounting a fixed blade.
Figure 6:
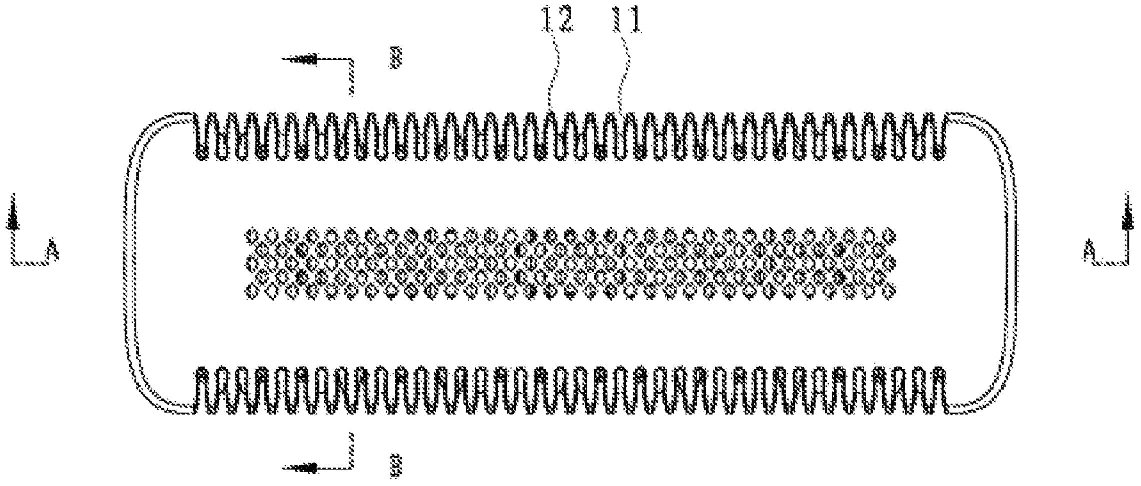
FIG. 6 is a top view of a reciprocating razor blade cartridge according to the present invention.
Figure 7:
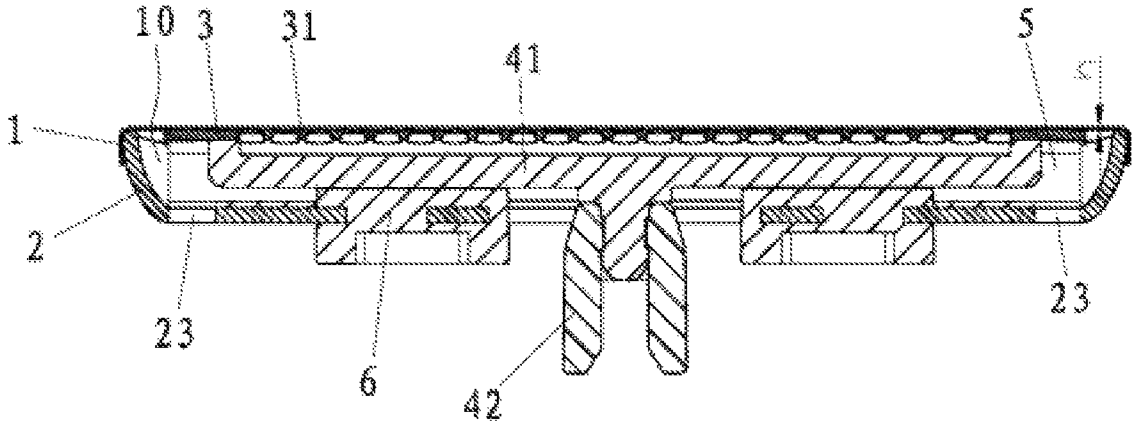
FIG. 7 is a sectional view taken along the direction A-A in FIG. 6.

A method of making the reciprocating razor blade cartridge described above, which comprises the steps of:

D. manufacturing a fixed blade 1 in an unfolded state and a fixed blade support 2 in a basin-shaped structure according to the design;

E. connecting the movable blade 3 with the transmission component 4 and mounting same in the fixed blade support 2, as shown in FIG. 5, wherein the movable blade 3 and the movable blade support 41 are fixedly connected and then put into the fixed blade support 2 from the basin opening, and the driving seat 42 is connected with the movable blade support 41 from the through hole on the basin bottom of the fixed blade support 2 and then placed below the bottom of the fixed blade support 2;

F. stretching the fixed blade 1 to the periphery, taking the edge of the basin opening of the fixed blade support 2 as a support, bending and tensioning the periphery of the fixed blade 1 downwards under the action of a certain external force, sticking to the outer side of the basin wall around the fixed blade support 2, and tightening and fixing the fixed blade 1 to the basin wall of the fixed blade support 2 by welding or riveting, so that the top surface of the fixed blade 1 and the side surface near the top surface are in a smooth transition, and wrapping the upper end of the fixed blade support 2 and the basin opening from top to bottom to form a leather drum structure.

In order to make the movable blade 3 and the fixed blade 1 abut and form a pre-pressure and improve the cutting sharpness, in the above-mentioned step B, an elastic pressing piece 5 can be installed in the fixed blade support 2 and arranged below the movable blade 3, and the movable blade 3 is elastically lifted above the basin opening of the fixed blade support 2 by the elastic pressing piece 5. Then, in step C, when the fixed blade 1 is wrapped around the basin opening of the fixed blade support 2, when the fixed blade 1 is bent around, tensioned and tightened on the basin wall of the fixed blade support 2, the inner side of the fixed blade 1 presses the movable blade 3 downwards against the movable blade 3, and a pre-pressure is formed between the movable blade 3 and the fixed blade 1.

The manufacturing method is simple in process and low in manufacturing cost; the top surface and the side surface near the top surface of the razor blade cartridge are formed by stretching an integral fixed blade 1 and then wrapping downward. The razor blade cartridge is smooth and in order and skin-fitting, and avoids the requirement for high rigidity of the fixed blade 1, so that the thickness of the fixed blade 1 can be made ultra-thin which cannot be realized by other process structures, so that the influence of the thickness of the fixed blade 1 can be ignored when shaving, and the body hair can be removed once.

The invention claimed is:

1. A reciprocating razor blade cartridge comprising a fixed blade and a fixed blade support for supporting and fixing the fixed blade, wherein the fixed blade is a flexible metal sheet having flexibility, the fixed blade support is a basin-shaped support, the fixed blade is supported by a basin opening edge of the fixed blade support, all sides of the fixed blade are bent downwards and wrapped on the outside of a basin wall all around the fixed blade support and make a top surface of the fixed blade and a side surface close to the top surface smoothly transition, an inner cutting cavity is formed between the fixed blade and the fixed blade support, hair inlet holes for body hair to enter the inner cutting cavity is provided on the fixed blade, and a movable blade which can reciprocate back and forth relative to the fixed blade and then cut off the body hair in the hair inlet holes are provided in the inner cutting cavity below the fixed blade, the movable blade is provided with cutting teeth corresponding to the hair inlet holes and used for cutting body hair, and the reciprocating razor blade cartridge further comprises a transmission component which passes through the bottom of the fixed blade support to connect the movable blade with the power device of the electric razor.

2. The reciprocating razor blade cartridge according to claim 1, wherein rounded corners are provided between the left and right basin walls and the front and rear basin walls of the fixed blade support to enable the left and right basin walls and the front and rear basin walls to be connected in a smooth transition.

3. The reciprocating razor blade cartridge according to claim 1, wherein the fixed blade support is provided with a hair removing hole for removing hairs cut in the inner cutting cavity.

4. The reciprocating razor blade cartridge according to claim 1, wherein the fixed blade and the fixed blade support are made of a weldable metal material, and the side surface of the fixed blade bent downwards from the periphery is welded on the basin wall around the fixed blade support.

5. The reciprocating razor blade cartridge according to claim 1, wherein the hair inlet holes are uniformly arranged on a left side and/or right side of the fixed blade, fixed cutting teeth are formed between two adjacent hair inlet holes, and the left and/or the right basin wall of the fixed blade support is provided with hair inlet grooves corresponding to the hair inlet holes, which can supply body hairs to and from the inner cutting cavity.

6. The reciprocating razor blade cartridge according to claim 2, wherein the hair inlet holes are uniformly arranged on a left side and/or right side of the fixed blade, fixed cutting teeth are formed between two adjacent hair inlet holes, and the left and/or the right basin wall of the fixed blade support is provided with hair inlet grooves corresponding to the hair inlet holes, which can supply body hairs to and from the inner cutting cavity.

7. The reciprocating razor blade cartridge according to claim 3, wherein the hair inlet holes are uniformly arranged on a left side and/or right side of the fixed blade, fixed cutting teeth are formed between two adjacent hair inlet holes, and the left and/or the right basin wall of the fixed blade support is provided with hair inlet grooves corresponding to the hair inlet holes, which can supply body hairs to and from the inner cutting cavity.

8. The reciprocating razor blade cartridge according to claim 4, wherein the hair inlet holes are uniformly arranged on a left side and/or right side of the fixed blade, fixed cutting teeth are formed between two adjacent hair inlet holes, and the left and/or the right basin wall of the fixed blade support is provided with hair inlet grooves corresponding to the hair inlet holes, which can supply body hairs to and from the inner cutting cavity.

9. The reciprocating razor blade cartridge according to claim 5, wherein the top surface and the left and right side surfaces of the fixed blade are respectively at an acute angle, and a chamfer with a smooth transition is formed between the top surface and the left and right side surfaces, wherein a height of the chamfer is less than 1.0 mm.

10. The reciprocating razor blade cartridge according to claim 6, wherein the top surface and the left and right side surfaces of the fixed blade are respectively at an acute angle, and a chamfer with a smooth transition is formed between the top surface and the left and right side surfaces, wherein a height of the chamfer is less than 1.0 mm.

11. The reciprocating razor blade cartridge according to claim 7, wherein the top surface and the left and right side surfaces of the fixed blade are respectively at an acute angle, and a chamfer with a smooth transition is formed between the top surface and the left and right side surfaces, wherein a height of the chamfer is less than 1.0 mm.

12. The reciprocating razor blade cartridge according to claim 8, wherein the top surface and the left and right side surfaces of the fixed blade are respectively at an acute angle, and a chamfer with a smooth transition is formed between the top surface and the left and right side surfaces, wherein a height of the chamfer is less than 1.0 mm.

13. The reciprocating razor blade cartridge according to claim 5, wherein the left side and/or the right side of the hair inlet holes is an isthmus structure recessed from the outer side to the inner side in the left-right direction, the isthmus structure is composed of a continuous smooth curve, and is wide to narrow from the outer side to the middle part, and then narrow to wide from the middle part to the inner side; the width at the inlet of the outer side is L1, the width at the narrowest part of the middle part is L2, and the corresponding cutting teeth is located at the inner side of the narrowest part of the middle part; the width of the isthmus structure at the position corresponding to the outer edge of the cutting teeth is L3, the depth from the narrowest part of the middle part to the outer edge of the corresponding cutting teeth is L4, and the depth from the inlet of the outer side to the outer edge of the corresponding cutting teeth is L5; the following relationship is satisfied: L1>L3>L2, and 0.1 mm≤L2≤0.3 mm, 0.1 mm≤L4≤1 mm, and L5≤1.2 mm.

14. The reciprocating razor blade cartridge according to claim 6, wherein the left side and/or the right side of the hair inlet holes is an isthmus structure recessed from the outer side to the inner side in the left-right direction, the isthmus structure is composed of a continuous smooth curve, and is wide to narrow from the outer side to the middle part, and then narrow to wide from the middle part to the inner side; the width at the inlet of the outer side is L1, the width at the narrowest part of the middle part is L2, and the corresponding cutting teeth is located at the inner side of the narrowest part of the middle part; the width of the isthmus structure at the position corresponding to the outer edge of the cutting teeth is L3, the depth from the narrowest part of the middle part to the outer edge of the corresponding cutting teeth is L4, and the depth from the inlet of the outer side to the outer edge of the corresponding cutting teeth is L5; the following relationship is satisfied: L1>L3>L2, and 0.1 mm≤L2≤0.3 mm, 0.1 mm≤L4≤1 mm, and L5≤1.2 mm.

15. The reciprocating razor blade cartridge according to claim 7, wherein the left side and/or the right side of the hair inlet holes is an isthmus structure recessed from the outer side to the inner side in the left-right direction, the isthmus structure is composed of a continuous smooth curve, and is wide to narrow from the outer side to the middle part, and then narrow to wide from the middle part to the inner side; the width at the inlet of the outer side is L1, the width at the narrowest part of the middle part is L2, and the corresponding cutting teeth is located at the inner side of the narrowest part of the middle part; the width of the isthmus structure at the position corresponding to the outer edge of the cutting teeth is L3, the depth from the narrowest part of the middle part to the outer edge of the corresponding cutting teeth is L4, and the depth from the inlet of the outer side to the outer edge of the corresponding cutting teeth is L5; the following relationship is satisfied: L1>L3>L2, and 0.1 mm≤L2≤0.3 mm, 0.1 mm≤L4≤1 mm, and L5≤1.2 mm.

16. The reciprocating razor blade cartridge according to claim 8, wherein the left side and/or the right side of the hair inlet holes is an isthmus structure recessed from the outer side to the inner side in the left-right direction, the isthmus structure is composed of a continuous smooth curve, and is wide to narrow from the outer side to the middle part, and then narrow to wide from the middle part to the inner side; the width at the inlet of the outer side is L1, the width at the narrowest part of the middle part is L2, and the corresponding cutting teeth is located at the inner side of the narrowest part of the middle part; the width of the isthmus structure at the position corresponding to the outer edge of the cutting teeth is L3, the depth from the narrowest part of the middle part to the outer edge of the corresponding cutting teeth is L4, and the depth from the inlet of the outer side to the outer edge of the corresponding cutting teeth is L5; the following relationship is satisfied: L1>L3>L2, and 0.1 mm≤L2≤0.3 mm, 0.1 mm≤L4≤1 mm, and L5≤1.2 mm.

17. The reciprocating razor blade cartridge according to claim 1, wherein the left and right basin walls and the front and rear basin walls of the fixed blade support are of the same height at the basin opening, the top surface of the fixed blade is a plane, and the top surface of the movable blade is a plane cooperating with the bottom surface of the fixed blade.

18. The reciprocating razor blade cartridge according to claim 1, wherein the front and rear basin walls of the fixed blade support are higher than the left and right basin walls, and the top portions of the front and rear basin walls are of an arc structure and smoothly transition with the left and right basin walls; the top surface of the fixed blade is an arc surface corresponding to the front and rear basin walls; and the top surface of the movable blade is an arc surface matching the bottom surface of the fixed blade.

19. The reciprocating razor blade cartridge according to claim 2, wherein the front and rear basin walls of the fixed blade support are higher than the left and right basin walls, and the top portions of the front and rear basin walls are of an arc structure and smoothly transition with the left and right basin walls; the top surface of the fixed blade is an arc surface corresponding to the front and rear basin walls; and the top surface of the movable blade is an arc surface matching the bottom surface of the fixed blade.

20. A method of making a reciprocating razor blade cartridge according to claim 1, comprising the steps of:

manufacturing the fixed blade in expanded state according to the design;

connecting the movable blade with the transmission component and installing same in the fixed blade support;

stretching the fixed blade to the periphery, taking the edge of the basin opening of the fixed blade support as a support, bending and tensioning the periphery of the fixed blade downwards under the action of a certain external force, adhering to the outside of the basin wall around the fixed blade support, and tightening and fixing the fixed blade to the basin wall of the fixed blade support by welding or riveting, so that the top surface of the fixed blade and the side surface close to the top surface are in a smooth transition, and wrapping the upper end of the fixed blade support and the basin opening from top to west to form a leather drum structure.

* * * * *